No. 875,239. PATENTED DEC. 31, 1907.
H. A. BRIGGS.
TYPE WRITING MACHINE.
APPLICATION FILED DEC. 4, 1900.
7 SHEETS—SHEET 2.
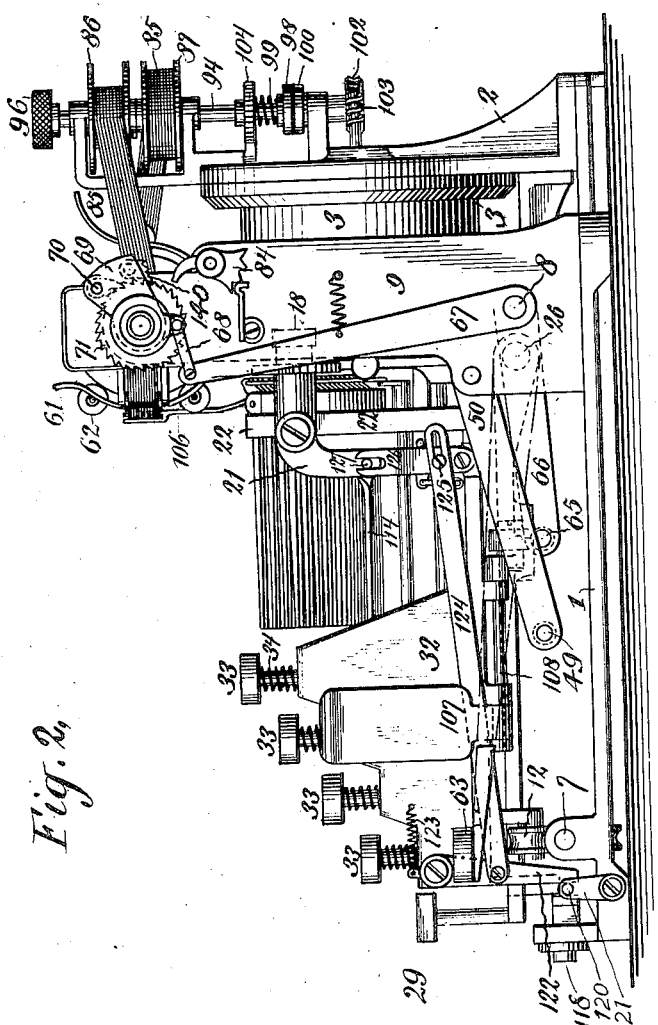
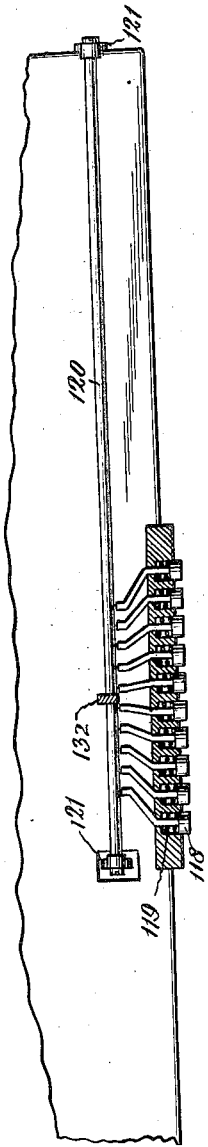
WITNESSES:
Wm. H. Shaw
Arthur F. Thompson
INVENTOR
Herbert A. Briggs
BY
Murphy & Metcalf
ATTORNEY

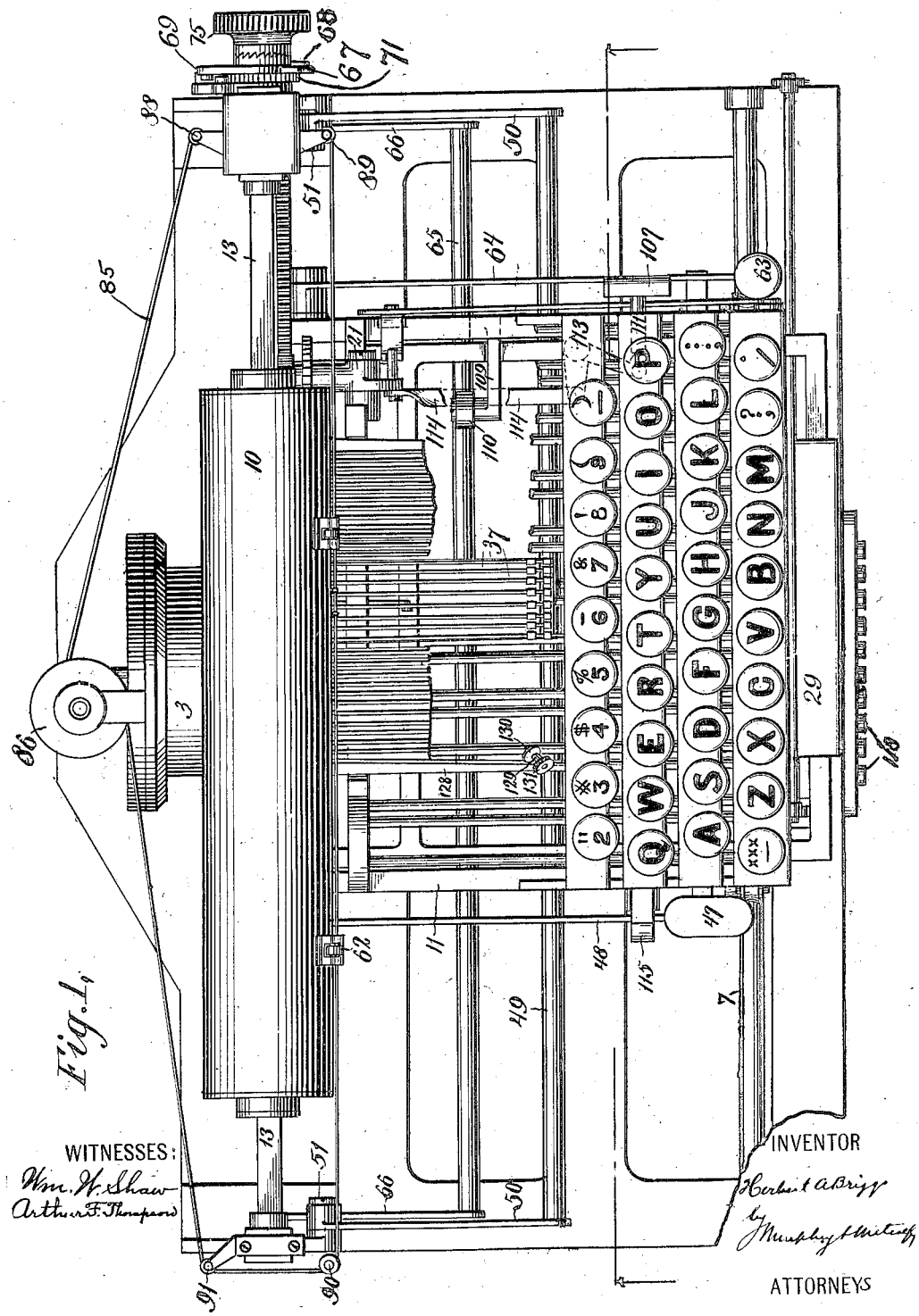

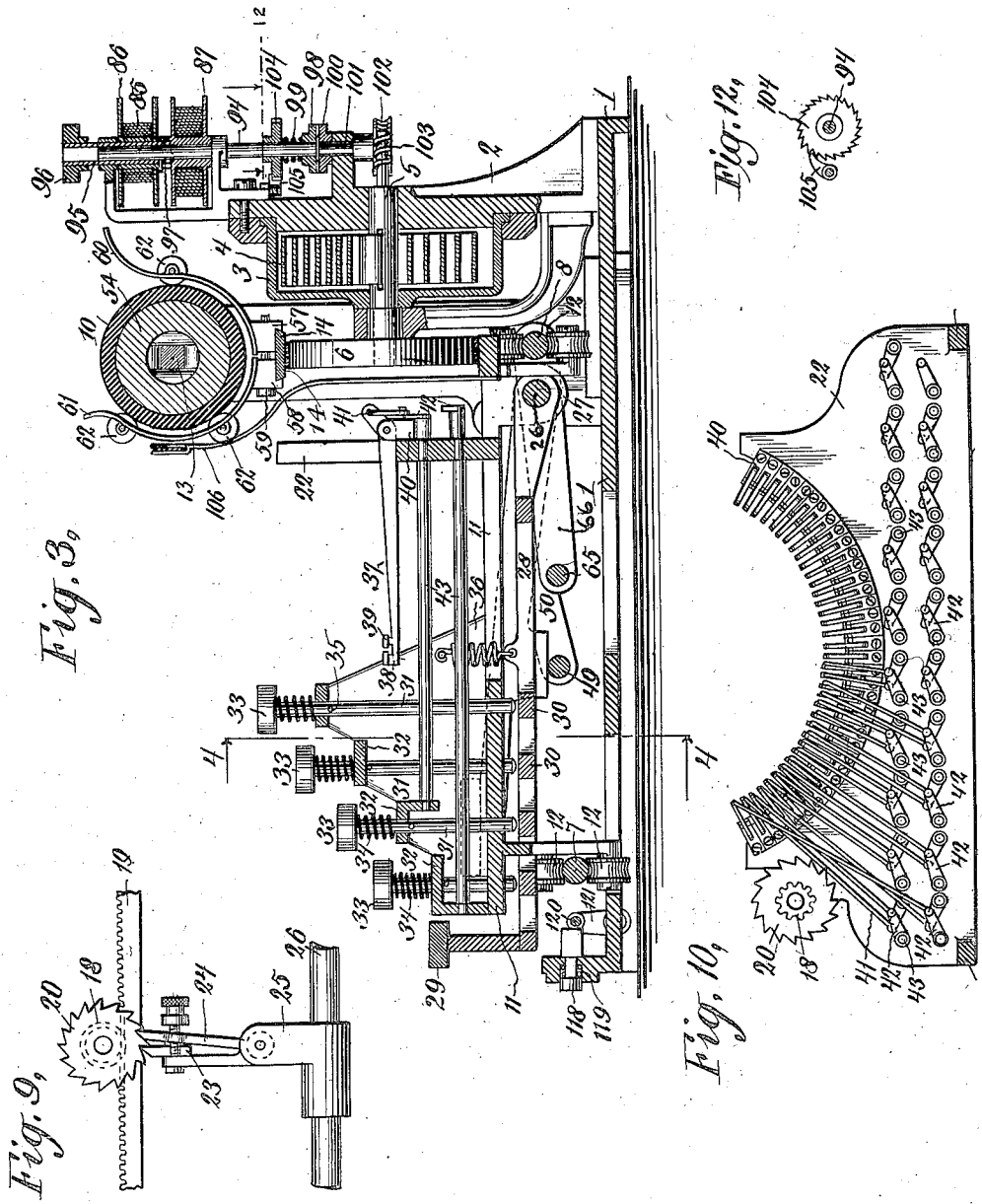

No. 875,239. PATENTED DEC. 31, 1907.
H. A. BRIGGS.
TYPE WRITING MACHINE.
APPLICATION FILED DEC. 4, 1900.

7 SHEETS—SHEET 4.

WITNESSES:
Wm. W. Shaw
Arthur F. Thompson

INVENTOR
Herbert A. Briggs
by Murphy & ...
ATTORNEYS

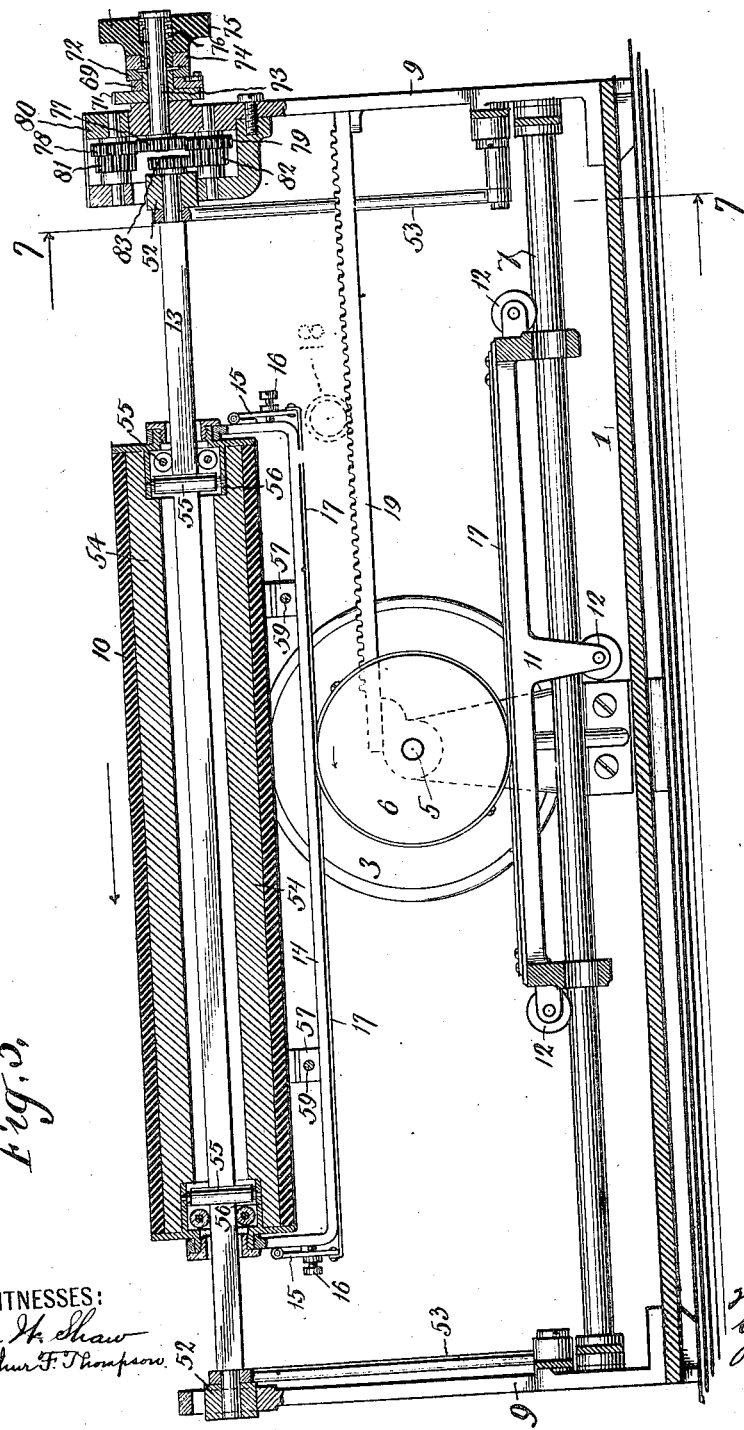

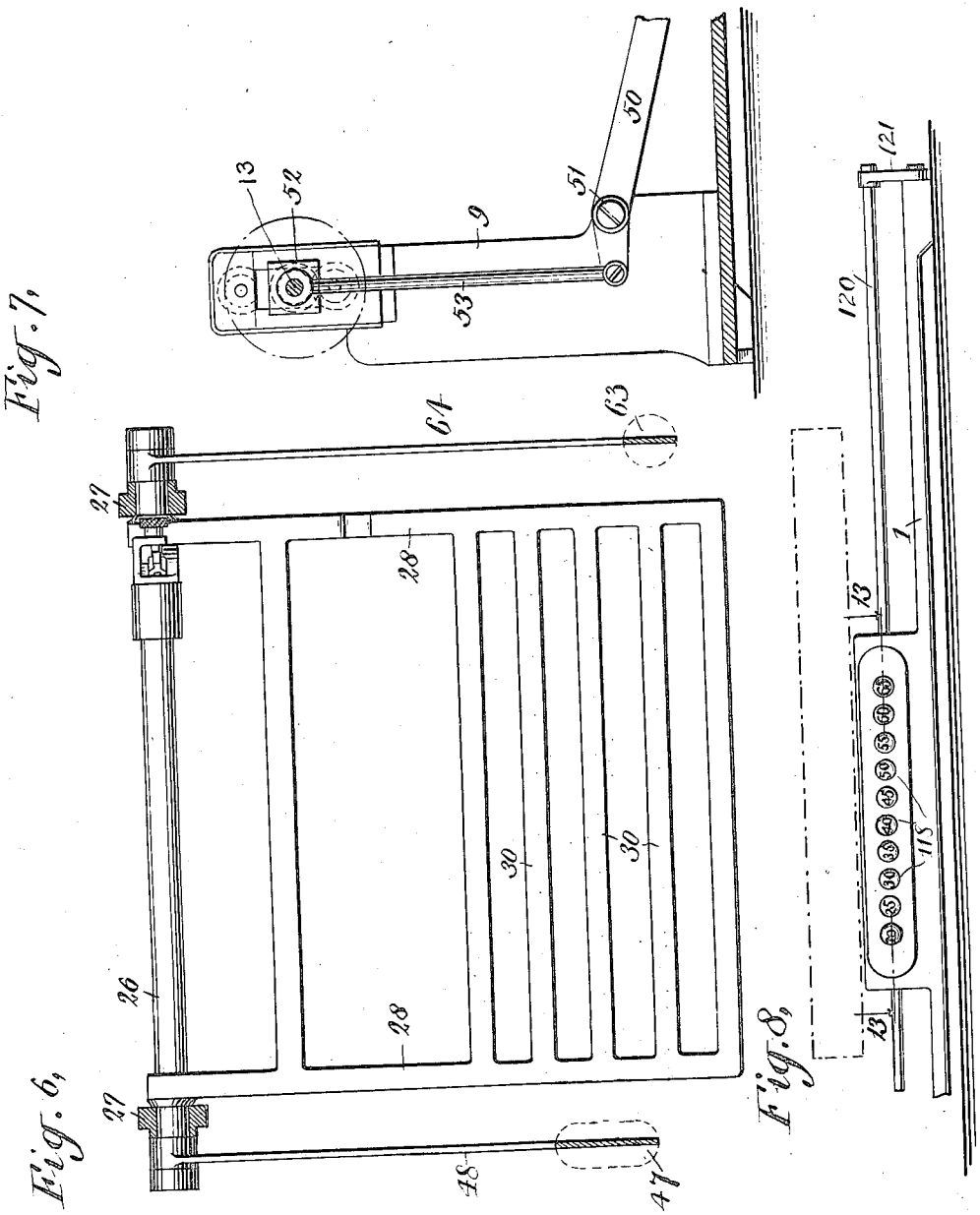

No. 875,239. PATENTED DEC. 31, 1907.
H. A. BRIGGS.
TYPE WRITING MACHINE.
APPLICATION FILED DEC. 4, 1900.

7 SHEETS—SHEET 7.

WITNESSES:
Wm. W. Shaw
Arthur F. Thompson

INVENTOR
Herbert A Briggs
BY
Murphey & Metcalf
ATTORNEYS

UNITED STATES PATENT OFFICE.

HERBERT A. BRIGGS, OF NEW YORK, N. Y.

TYPE-WRITING MACHINE.

No. 875,239.  Specification of Letters Patent.  Patented Dec. 31, 1907.

Application filed December 4, 1900. Serial No. 38,606.

*To all whom it may concern:*

Be it known that I, HERBERT A. BRIGGS, a citizen of the United States, and a resident of the borough of Manhattan, city, county, and State of New York, have made certain new and useful Improvements in Type-Writing Machines, of which the following is a full, clear, and exact description, reference being had to the accompanying drawings, forming part of this specification.

The principal objects of my invention are to simplify the movement of the operating parts of the machine; to reduce the maximum movement of the parts in returning them to position for the beginning of a new line; to provide means by which such movement may be effected and controlled without requiring the lifting of either hand from the key board; to keep the paper as directly in front of the operator as possible at all times; to permit the observation of the work as it is written; and to provide a simple case shift which shall operate effectively in conjunction with the features above mentioned.

To these ends the invention consists substantially in the construction, arrangement and combination of parts and details herein shown and described and specifically pointed out in the claims.

Figure 4:
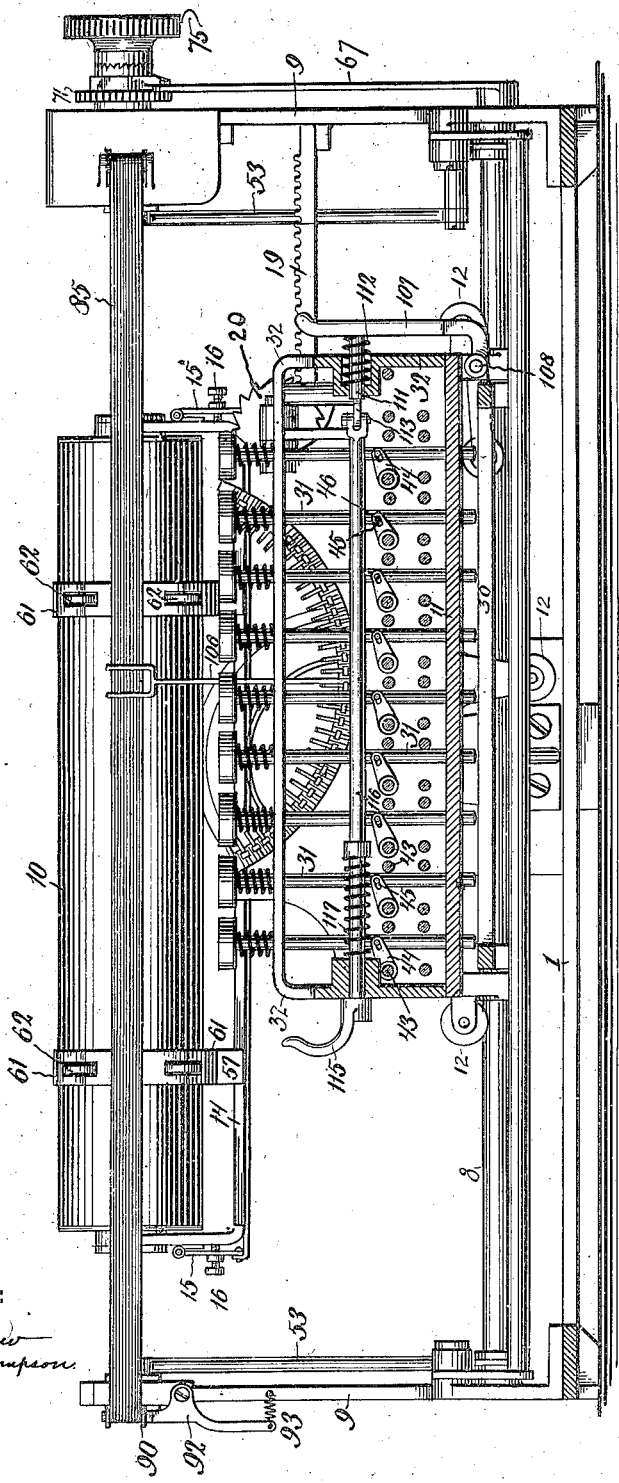
Figure 11:
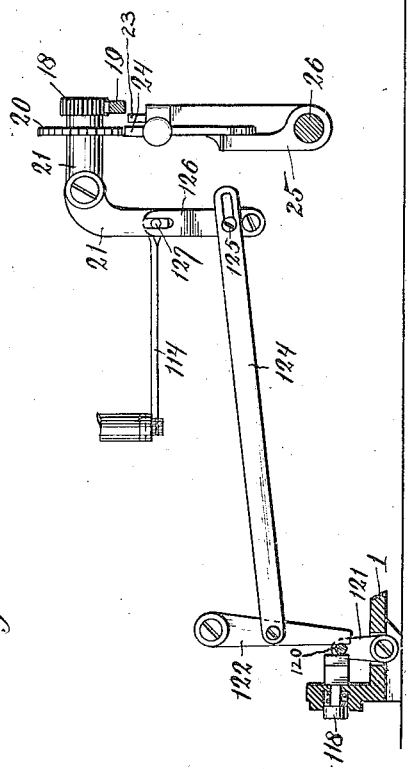

In the drawings, Figure 1 is a plan view of a typewriting machine embodying my invention; Fig. 2 is a side elevation; Fig. 3 is a central vertical transverse section; Fig. 4 is a longitudinal section on the line 4—4 (Fig. 3); Fig. 5 is a longitudinal vertical section through the platen and paper carriage; Fig. 6 is a detail plan view partly in section showing the universal frame; Fig. 7 is a vertical section on the line 7—7 (Fig. 5); Fig. 8 is a detail showing the base plate and tabulating keys in elevation; Fig. 9 is a detail showing a front elevation of the escapement device; Fig. 10 is a rear elevation of the type carriage; Fig. 11 is a skeleton elevation showing the tabulating and releasing mechanism; Fig. 12 is a detail view on the line 12—12 (Fig. 3) showing the ratchet and pawl of the ribbon feed, and Fig. 13 is a horizontal section on the line 13—13 (Fig. 8) showing the tabulating mechanism.

Similar reference characters are employed to designate corresponding parts in all the views.

The machine shown in the drawings and which I will describe as embodying my improvements in their preferred form comprises a base plate 1, at the back of which is carried a bracket 2, which supports a shell or casing 3. A coil spring 4 is arranged in the casing 3, one end of said spring being secured to said casing and the opposite end to the rotatable shaft 5, journaled in the bracket 2. A wheel 6 is rigidly secured to the front end of the shaft 5. Extending across the front of the machine and supported by lugs at the sides of the base plate is the rod 7. A rod 8 (which, for purposes to be presently described, is a rock shaft) also extends across the machine near the back and is journaled in standards 9—9, which rise from the base plate and support the platen 10 and paper carriage, as will be more fully described hereafter.

The rods 7 and 8 serve as guides or tracks for the type carriage 11, which is provided with lugs, in which are mounted wheels 12, which run on the guide-rods 7 and 8. These wheels are arranged to engage with both the upper and under surfaces of the rods, so that while the carriage is rigidly supported it may be moved freely from side to side of the machine. The platen 10 is mounted to slide freely on the shaft 13 (preferably square in section) which is carried by the standards 9,—9, suitable anti-friction devices to be hereafter described being provided to reduce the friction between the rod and the platen. A frame 14 extends longitudinally below the platen and is secured thereto at each end. Links 15 are pivoted at each end of the frame 14 and set screws 16 are provided for the links 15, so that their position may be adjusted relatively to the frame. A steel tape 17 is connected to the link 15 at the right of the paper carriage and extending along the under surface of the frame 14 half encircles the wheel 6, to which it is secured, and is connected to the right hand end of the type carriage. A similar tape is connected to the link 15 at the opposite end of the paper carriage and encircling the other half of the wheel 6 is connected thereto and to the type carriage at the left side. Other means for positively connecting the type and paper carriage, such as double rack and gear, may of course be employed if desired.

The coil spring 4, secured to the casing 3 and to the shaft 5, tends to rotate the wheel 6 in the direction shown by the arrow in Fig. 5, and, owing to the connections between the wheel and the paper carriage and between the wheel and the type carriage, the rotation of the wheel 6 will simultaneously carry the paper carriage to the left (Fig. 5) and the type carriage to the right. This action of the spring 4 is however controlled by an escapement device, which regulates the movement of a pinion 18 mounted on the type carriage and engaging the stationary rack 19. The pinion 18 is secured to a racthet 20 and both are carried at the inner end of the bell-crank lever 21, which is pivotally secured to the plate 22, upon which the type bars and connection are mounted and which forms part of the type carriage. The pawls 23 and 24, which control the movement of the escapement, are carried by an arm 25 secured to the rock shaft 26, so that when the rock shaft is actuated the pawls will be vibrated across the face of the ratchet 20 and will permit the ratchet 20 to rotate the distance of one tooth each time the rock shaft is actuated. The rock shaft 26 is journaled in downwardly projecting lugs 27 on each side of the type carriage.

Secured to the rock shaft 26 is the universal frame 28, which carries at its front end the space bar 29 and is also provided with a series of cross bars 30 so arranged that each bar will lie immediately below one row of the key rods 31, which are supported in a suitable frame 32, carried by the type carriage 11. The keys 33 are secured to the upper ends of the key rods and coil springs 34 are interposed between the keys and the key-rod bearings in the frame 32. Stop pins 35, carried by the key-rods, engage with the under surface of the key-rod bearings and limit the upward movement of the key-rods. Upon the depression of any one of the keys 33, the lower end of the corresponding key-rod will engage with one of the cross bars 30 and depress the frame 28, rocking the shaft 26 and swinging the pivoted pawl 24 out of engagement with the teeth of the ratchet 20, which however will be held from rotation by the fixed pawl 23. The pivoted pawl 24 will under the action of a spring (not shown) be thrown into the position shown in Fig. 9 and upon the release of the key the frame 28 will be drawn up by the spring 36 and the rock shaft moved to carry the pawls back, the pivoted pawl on the return movement engaging with the tooth of the ratchet next to that in engagement with the fixed pawl, and as soon as the fixed pawl is carried back far enough to release the ratchet it will, under the action of the coil spring 4, be rotated the distance of one tooth, carrying the pivoted pawl into engagement with the arm 25, which will arrest the movement of the ratchet wheel and relock the pinion 18 with the rack 19. The release of the locking engagement between the type carriage (which carries the pinion 18) and the rack will permit the type carriage to be drawn, (by the rotation of wheel 6 under the action of coil spring 4), to the right a distance equal to one half the predetermined space between the centers of the letters, and the paper carriage an equal distance to the left. The same effect will be produced by depressing the space bar 29. This simultaneous movement of the type carriage and the paper carriage in opposite directions is thus effected each time a type key or the space bar is actuated.

The type levers 37, each of which carries at its forward end an upper case character 38 and a lower case character 39, are pivoted in blocks 40, which are mounted upon the plate 22 at the rear of the type carriage. The inner end of each type lever is connected by a link 41 with a crank 42, mounted on a rock shaft 43, one end of which is journaled in the plate 22 and the opposite end of which is journaled in the frame 32. The forward end of each rock shaft is provided with a crank 44, formed with a slot 45, which engages with a pin 46, carried by each key-rod 31, so that when any key is depressed its rock shaft will be rotated, drawing down the inner end of its type lever, carrying the type end upwards into contact with the ink ribbon and making an impression on the paper in the machine. The parts are so arranged that when in the position shown in Fig. 3 the inner or lower case character will produce the impression when its key is operated. In order to produce an impression of the upper case character the paper carriage is elevated a distance equal to that between the centers of the upper and lower case characters. This elevation of the paper carriage is produced by depressing the case-shift key 47, which is carried by the lever 48 mounted on the shaft 26. The lever 48 rests upon rod 49, which is carried by arms 50, pivoted at 51 to the standards 9, 9 at the sides of the machine. The shaft 13, which supports the paper carriage, is journaled in blocks 52, which slide vertically in ways formed in the standards 9, 9 and these bearing blocks 52 are connected by rods 53 with the inner ends of the arms 50 (Fig. 7). By depressing the case shift key 47 the rod 49 will be carried down, lifting the inner ends of the arms 50 and elevating the paper carriage into position to receive upon the paper an impression of any upper case character that may be struck. If desired the weight of the paper carriage may be depended upon to cause it to return to its normal position when the key is released.

The paper carriage comprises the cylindrical platen 10 consisting of any suitable impression surface, preferably mounted upon a core 54. The platen is supported to slide freely on the shaft 13 by means of anti-friction bearing devices, by which the entire weight of the platen and other parts of the paper carriage are borne. As shown in Fig. 5 these bearing devices are provided at each end of the platen, and each consists of four rollers 55, journaled in a frame 56 carried by the core 54, the four rollers at each end being arranged so that each one bears firmly against one side of the square shaft 13. The frame 14 is secured to the ends of the platen. This frame, as shown in Fig. 3, is beveled and serves as a support for the blocks 57 and 58, which are adjustably clamped to the frame 14 by set screws 59. Spring arms 60 and 61 are secured to the blocks 57 and 58, and carry the paper feeding guide rollers 62. The position of the rollers 62 relatively to the platen can be varied to suit the size of paper or margin desired, by loosening the set screws 59 and changing the position of the blocks 57 and 58.

The paper to be written upon is inserted between the platen and the guide rollers 62, and to effect the regular feeding of the paper in the operation of the machine I provide a paper feed key 63, which is carried by the lever 64 journaled on the shaft 26. The lever 64 rests upon the rod 65, which is supported by arms 66 secured to the rock shaft 8. A lever 67 (Fig. 2) is also secured to said shaft, and by the link 68 is connected with the plate 69, which carries a pawl 70 which operates a ratchet 71 and a clutch disk 72. The ratchet and clutch disk are connected with each other but are both mounted loosely on the shaft 73. The clutch disk 72 engages with a disk 74, which forms the opposite member of the clutch and is connected to a thumb wheel 75, which is splined to the shaft 73 and is pressed inwardly by the spring 76 to hold the two clutch members in contact. The clutch may consist of the friction disks shown in Fig. 5 or the opposing surfaces of the two members may be roughened or toothed as indicated in Fig. 1. A pinion 77 is fixed upon the shaft 73 and meshes with the gears 78 and 79, which are mounted upon shafts carried by the frame 80. A gear 81 is mounted upon the same shaft as the gear 78, and a gear 82 on the same shaft as the gear 79. A pinion 83 is fixed upon the end of the shaft 13, and meshes with the gear 82 when the platen is in its normal or lower case position; but when the platen is raised to its upper case position the pinion 83 will be carried out of engagement with gear 82 and into engagement with gear 81. Thus a downward movement of the paper feed key will, in any position of the type carriage, depress the rod 65, draw forward the lever 67 and operate the ratchet wheel, the movement of which will be imparted by the clutch to the shaft 73, pinion 77 and to all the pinions 78, 79, 81 and 82, and through either pinion 81 or pinion 82, with whichever the pinion 83 is in mesh, to the shaft 13 and the platen will be rotated. When it is desired to turn the platen freely it is released from the control of the pawl and ratchet by simply pulling the thumb piece 75 against the spring 76, so as to carry the clutch members out of engagement, when, by turning the thumb piece, the platen will be rotated. A stop 84, is pivoted to the standard 9. Its lower end is provided with three notches which engage with a spring secured to said standard. The stop 84 may thus be set in any one of three positions. The upper end of the stop 84 lies in the path of the pawl 140 carried by the plate 69 and will engage it at different points in its movement, depending upon the position of the pawl 84. In this manner the movement imparted to the platen at each operation of the paper feeding mechanism, and consequently the distance between the written lines may be regulated as desired.

The ink ribbon 85 is carried on the spools 86 and 87, upon which the ribbon is wound in opposite directions, and which are rotatably supported at the back of the machine. The ribbon passes from the upper spool 86 over the guide rollers 88 and 89 (Fig. 1), across the front of the platen and over the guide rollers 90 and 91 to the lower spool. The guide roller 90 also serves as a tension roller, being mounted on an arm 92, the lower end of which is connected to the standard 9 by the spring 93, which thus keeps the ribbon taut. The ribbon spools are loosely mounted on the shaft 94 and between the spool 86 and the shaft 94 is the sleeve 95, which rotates with the shaft but may be moved up and down thereon by means of the thumb piece or head 96. The lower end of the sleeve 95 is provided with a pin 97, which, when the sleeve 95 is in its lowermost position, engages with a notch formed in the hub of the spool 87, and when the sleeve is in its uppermost position with a notch in the hub of the spool 86. Thus any rotary movement of the shaft 94 will be imparted to the sleeve 95 and to one or the other of the ribbon spools, depending upon the position of the sleeve. The lower end of the shaft 94 is provided with a disk 98, which, by the spring 99, is held in frictional engagement with a corresponding disk 100 on the shaft 101. On the lower end of the shaft 101 is a worm wheel 102, which is driven by the worm 103 formed on an extension of the shaft 5. A ratchet wheel 104 on the shaft 94 (Fig. 12) is engaged by a pawl 105 secured to the frame of the machine so as to permit shaft 94 to turn as the paper carriage is moved back from the end to the beginning of a line, but which will prevent it from turning as the carriage feeds step by step during the printing of a line,—the slipping of the friction disks 98 and 100 permitting the shaft 101 to turn when the shaft 94 is thus locked.

In the operation of the machine when the ribbon has been wound from one spool to the other the thumb piece 96 is moved to bring the pin 97 into the notch on the hub of the empty spool. The full spool will thus be free to revolve to permit the ribbon to unwind as the latter is wound on the empty spool. When this spool is filled the connection between the sleeve 95 and the then empty spool is reëstablished and the ribbon is wound in the opposite direction to that spool, the winding of the ribbon in different directions on the spools causing its motion to be reversed although the spools themselves both revolve in the same direction. I am enabled to dispense with the feeding of the ribbon during the forward or feeding movement of the paper carriage, because as the type carriage itself travels a new surface is presented to each type although the ribbon is stationary, and the movement which is imparted to the ribbon on the return movement of the carriage may be very slight, although it will be understood that the amount of such movement may be varied as desired by changing the proportion of the gears which effect the ribbon feed.

The ribbon passes in front of the platen, and at the center or printing point is supported by a forked spring arm 106, which is carried by the type carriage. The ribbon is embraced on both sides by the fingers of the arm 106, which normally hold it far enough away from the platen to permit the operator to see the printing behind it, and the arm is sufficiently resilient to permit the ribbon to be freely carried against the paper by the impact of the type and as soon as the type is withdrawn to return the ribbon to its normal position, enabling the operator to readily observe the writing.

I do not claim herein the ribbon feeding and supporting mechanism just described as the same forms the subject matter of a divisional application filed by me July 16th, 1901, Serial No. 68,457.

By effecting a simultaneous movement of the type carriage and the paper carriage in opposite directions, the paper carriage is required to travel only half the length of the line, or half the distance it would necessarily travel if all the movement occurred, as in the usual type of machine, in the paper carriage alone. This arrangement not only reduces the movement necessary in restoring the carriage to its initial position, but keeps the work much more closely under the eye of the operator. As the two carriages both move and are positively connected I am enabled to provide for the release of the escapement mechanism, the return of the carriages to their initial position and for the feeding of the paper for a new line by one movement, without requiring the removal of either hand from the type keys. This is accomplished by the lever 107, which is secured to the rock shaft 108, journaled in lugs formed on the type carriage. To the opposite end of the shaft 108 is secured the arm 109, carrying the roller 110, which bears on the upper surface of the rod 65, the downward movement of which operates the paper-feeding mechanism as hereinbefore described.

Secured to the lever 107 is the pin 111, which extends through the frame 32. A spring 112 normally holds the lever 107 in the position shown in Fig. 4. The inner end of the pin 111 bears against one arm of the bell crank lever 113, the opposite arm of which is pivoted to the forward end of the rod 114. The opposite end of the rod 114 is pivoted to the bell crank lever 21, which carries the pinion 18 and ratchet 20. It is now apparent that if the lever 107 be pressed to the left, which can readily be done without removing either hand away from the keyboard, the inward movement of the rod 114 so produced will lift the pinion 18 from the rack 19, releasing the type carriage, which can be moved to the left, the paper carriage being simultaneously moved to the right, into position for commencing a new line; while at the same time the downward movement of the rod 65 will, as before described, operate the paper-feeding mechanism to turn the platen and advance the paper the distance of one line. I also provide mechanism by which the releasing mechanism may be actuated from the left side of the key board, which consists of a hook 115, connected with the rod 116 (Fig. 4), the opposite end of which is connected with the bell crank 113. A spring 117, surrounding the rod 116, is held under compression between a collar on said rod and the bushing on the side of the frame 32, through which the rod 116 passes. By pulling on the hook 115 the bell crank 113 and connecting rod 114 will be moved to release the pinion 18 from engagement with the rack 19 to permit the type and paper carriages to be moved into any desired position, and upon releasing the hook 115 the spring 117 will cause the pinion 18 to reëngage the rack 19 and relock the carriages.

In tabulated work it is inconvenient to move the carriage along step by step by means of the space bar until the desired printing position is reached. To obviate the necessity for this I have devised mechanism by which the type and paper carriages may be released and their movement arrested at any predetermined point by one operation of a single key. This mechanism consists of a series of numbered, horizontally arranged keys 118 (Figs. 1, 8 and 13), mounted at the front of the base of the machine. These keys bear numbers which correspond to selected numbers on the scale of the machine and preferably are numbered as shown in Fig. 8. The keys 118 are yieldingly supported by the springs 119. The shanks of the keys 118 extend inwardly to the bar 120, which is supported by the pivoted arms 121 on each side of the base of the machine. A lever 122 is pivoted to the frame 32 of the type-carriage and its lower end is held against the bar 120 by the spring 123. A rod 124 is at one end pivoted to the lever 122 and its opposite end is provided with a slot, which engages with a stud 125 on the lever 126, which is pivoted to the type carriage. The slotted upper end of the lever 126 engages with a stud 127 on the bell crank lever 21, which carries the pinion 18. An inward pressure on one of the keys 118 will press back the bar 120, lever 122, rod 124 and lever 126, rocking the bell crank 21, lifting the pinion 18 out of engagement with rack 19 and releasing the carriages. A depending lug 132 is carried by the frame 32 of the type carriage and when any one of the keys 118 is pressed inwardly to release the carriages said lug will, as the type carriage is moved to the right by the action of the spring 4, engage with the shank of such key and arrest the movement of the carriage at that point indicated on key pressed. Thus if any one of the keys 118 is pressed inwardly the carriages will be stopped at a point at which the character to be next struck will print opposite the number on the scale which corresponds to the number on the key.

The slot in the end of the arm 124 permits the bell crank 21 to be operated by the other releasing devices heretofore described without affecting the rod 124, since when the crank is so operated the stud 125 will move along the slot without moving the lever 124 and its connected parts.

With the usual form of typewriter much time is lost in erasing and underscoring, sixty or more distinct operations of the character selected for that purpose being necessary to erase or underscore a full line. I have provided a device by which either operation may be performed by simply holding down one key and releasing the carriage. This consists of a lever 128, operated by a key in the same manner as the type levers are operated, but instead of carrying fixed alphabetical or numerical characters, this lever is provided with a wheel or disk 129, journaled on the end of the type lever to revolve in horizontal plane when in operative position. One end of the cylinder is provided with a flange 130 having a smooth plane surface, and the other end with a flange 131 having a surface on which a continuous row of raised characters similar to the letter x is formed. By depressing the key controlling the lever 128 the lower flange 130 will be brought against the ribbon, carrying it into contact with the paper. If now the carriage be released by operating the hook 115 a continuous straight line will be made under the letters on the paper. If instead of underscoring it be desired to erase a line or word, the case shift key 47 is operated to raise the paper carriage, the key controlling the lever 128 is depressed and a continuous row of the characters on the flange 131 will be printed over the line or word to be erased, it being understood of course that when the underscoring or erasing is not to extend to the end of the line the movement of the carriage is to be stopped at the proper point either by releasing the hook 115 or in certain cases by setting one of the tabulating keys 118.

I have in the foregoing description of my improvements referred only to the specific form of mechanism illustrated in the drawings and which embodies only the preferred form of machine which I have devised. It is to be understood that my invention is not limited to that special form of machine, since some of the improvements are capable of use in the ordinary type of machine and many changes and modifications in form and arrangement may be made without departing from the spirit of my invention.

Having thus shown and described my invention what I claim as new and desire to secure by Letters Patent is 1. In a typewriting machine, the combination of a movable paper carriage, and a type carriage connected to move simultaneously with the paper carriage, the direction of the movement of the type carriage being opposite to that of the paper carriage and in line with the longitudinal axis of the latter.

2. In a typewriting machine the combination of a traveling type carriage, a paper carriage and a spring controlled by the type keys for imparting movement to said carriages in opposite directions.

3. In a typewriting machine the combination of a traveling paper carriage, a traveling carriage which carries the type and type keys, a connection between said carriages, so arranged that the movement of one carriage will simultaneously move the other carriage in the opposite direction, and a spring controlled by the type keys for imparting movement to said carriages.

4. In a typewriting machine the combination of a traveling paper carriage, a traveling carriage which carries the type and type keys, connections between said carriages by which the movement of one carriage will be imparted to the other in the opposite direction, a spring for imparting movement to said carriages and a device controlled by the type keys for releasing and locking the carriages.

5. In a typewriting machine the combination with the shaft which supports the paper carriage, a pinion upon said shaft, two separate but positively connected gears, connections between said gears and the paper feed lever and means for shifting the position of the paper carriage and throwing said pinion into engagement with one or the other of said gears.

6. In a typewriting machine the combination of the paper feed key, a pinion actuated thereby, two separate gears meshing with said pinion, a pinion connected with the platen and arranged to engage with one or the other of said gears and means for shifting the engagement of said pinion from one gear to the other as the position of the platen is shifted.

7. In a typewriting machine the combination of a paper feed key, a pinion actuated thereby, connections between said pinion and the platen by which the latter is rotated by the rotation of the pinion, a thumb piece rotatably connected with the platen and normally connecting said platen with the paper feed key and means, actuated by the movement of the thumb piece, for disconnecting the platen and the paper feed key to permit the platen to be rotated in either direction by the thumb piece.

8. In a typewriting machine the combination of a paper feed key, a pinion actuated thereby, two separate gears meshing with said pinion, a pinion connected with the platen and arranged to engage with one or the other of said gears, means for shifting the engagement of said pinion from one gear to the other as the position of the platen is shifted, a thumb piece rotatably connected with the platen and normally connecting the same with the paper feed key and means, actuated by the movement of the thumb piece, for releasing such connection to permit the platen to be rotated in either direction.

9. In a typewriting machine the combination of a traveling paper carriage, a traveling type carriage, a series of keys corresponding to predetermined positions of the paper carriage, a stop having movement with the type carriage and connected therewith, the keys and stop coöperating to stop said carriage in any of its predetermined positions and means, actuated by said keys, for releasing the carriage.

10. In a typewriting machine, the combination of a traveling type carriage, feed controlling devices therefor, a releasing device connected with said feed controlling devices, paper feeding means, and means, controlled from the key-board, for causing the type carriage to be released and returned to its initial position and for effecting the feeding of the paper.

11. In a typewriting machine the combination of a traveling type carriage, feed controlling devices therefor, a releasing device carried by said carriage and connected with said feed controlling devices, means for effecting the feed of the paper and connections between the latter and said releasing device whereby the type carriage may be released and returned to its initial position and the feeding of the paper may be effected without moving the hand away from the key board.

12. In a typewriting machine the combination of a traveling type carriage, feed controlling devices therefor, comprising a rack and pinion and escapement, a releasing device carried by the type carriage, comprising a spring pressed lever, connections between the latter and the feed controlling devices, mechanism for rotating the platen to feed the paper and connections between the latter and said lever whereby the actuation of said lever will release the engagement between the rack and pinion and rotate the platen to feed the paper.

13. In a typewriting machine, the combination of a platen, printing instrumentalities, a rotatable shaft upon which the platen is mounted so as to turn therewith, and means actuated by the type keys for effecting a letter spacing movement of both the platen on its shaft, and said printing instrumentalities.

14. In a typewriting machine, the combination with a traveling paper carriage and a traveling type carriage, of an underscoring or canceling device comprising a wheel or disk, the perimeter of which forms the impression surface, a lever upon which said wheel or disk is journaled, a key mounted in proximity to the type keys of the machine, connections between said key and said lever, a series of keys corresponding to predetermined positions of the paper carriage, means actuated by such keys for releasing the carriage, and means for stopping the carriage in any of such predetermined positions when the corresponding key is actuated.

15. In a typewriting machine, the combination of a platen, printing instrumentalities, and means for affording letter spacing movements to both the platen and printing instrumentalities.

16. In a typewriting machine, the combination of a power driven platen, and printing instrumentalities that are adapted to be automatically moved in a direction opposite to the feed movement of the platen at each letter space movement thereof.

17. In a typewriting machine, the combination of a platen that is movable for letter spacing, printing instrumentalities that are movable for letter spacing, and escapement devices controlling the letter spacing movements of the platen and printing instrumentalities.

18. In a typewriting machine the combination of a traveling paper carriage and a traveling type carriage movable in opposite directions parallel with the printing line.

19. In a typewriting machine, a traveling paper carriage and a traveling type carriage movable in opposite directions parallel with the printing line, and means for effecting the movement of one carriage through the movement of the other.

20. In a typewriting machine, a traveling paper carriage, a traveling type carriage, and means for simultaneously effecting the movement of one carriage through the movement of the other and in an opposite direction to the latter.

21. In a typewriting machine, a traveling paper carriage, a traveling type carriage, and a device comprising means for dividing, between the two carriages, the travel necessary to get from the final character of one printed line to the initial character of the next line.

HERBERT A. BRIGGS.

Witnesses:
GEORGE A. MORSE,
ANDREW REED.